United States Patent [19]

Sabater et al.

[11] 4,312,592

[45] Jan. 26, 1982

[54] METHOD AND DEVICE FOR THE MEASUREMENT OF LINEAR SPEEDS WITHOUT CONTACT AND WITHOUT MARKING

[75] Inventors: Jacques Sabater, Gif sur Yvettes; Serge Bauduin, La Tronche, both of France

[73] Assignee: Agence Nationale de Valorisation de la Recherche (ANVAR), Neuilly sur Seine, France

[21] Appl. No.: 125,313

[22] Filed: Feb. 28, 1980

[30] Foreign Application Priority Data

Feb. 28, 1979 [FR] France ............................ 79 05165

[51] Int. Cl.³ ............................................. G01P 3/36
[52] U.S. Cl. ...................................... 356/28; 356/373
[58] Field of Search ....................... 356/28, 28.5, 373

[56] References Cited

U.S. PATENT DOCUMENTS

| | | | |
|---|---|---|---|
| 3,446,558 | 5/1969 | Seaton | 356/28.5 |
| 3,508,066 | 4/1970 | Agar | 356/28 |
| 3,689,157 | 9/1972 | Andermo | 356/28 |
| 3,804,518 | 4/1974 | Meyr | 356/28 |
| 3,865,487 | 2/1975 | Andermo | 356/28 |
| 4,155,647 | 5/1979 | Michel | 356/28 |
| 4,201,467 | 5/1980 | Hartmann et al. | 356/28 |

FOREIGN PATENT DOCUMENTS 2636769  11/1977  Fed. Rep. of Germany ........ 356/28

OTHER PUBLICATIONS

J. T. Ator, Applied Optics, vol. 5, No. 8, Aug. 1966, p. 1325.

Primary Examiner—S. C. Buczinski
Attorney, Agent, or Firm—Sughrue, Mion, Zinn, Macpeak and Seas

[57] ABSTRACT

For continuous measurement of the linear speed of relative travel of an object 11 in front of a measuring device 10 two fixed zones 21,22 in the path of the object are illuminated by means of two parallel laser beams emitted by a single source 15, images of the two zones illuminated are formed upon one and the same transducer 17 the output signal from which is processed electronically by autocorrelation in order to determine the time of travel of a point on the object in going from one illuminated zone to the other.

4 Claims, 7 Drawing Figures

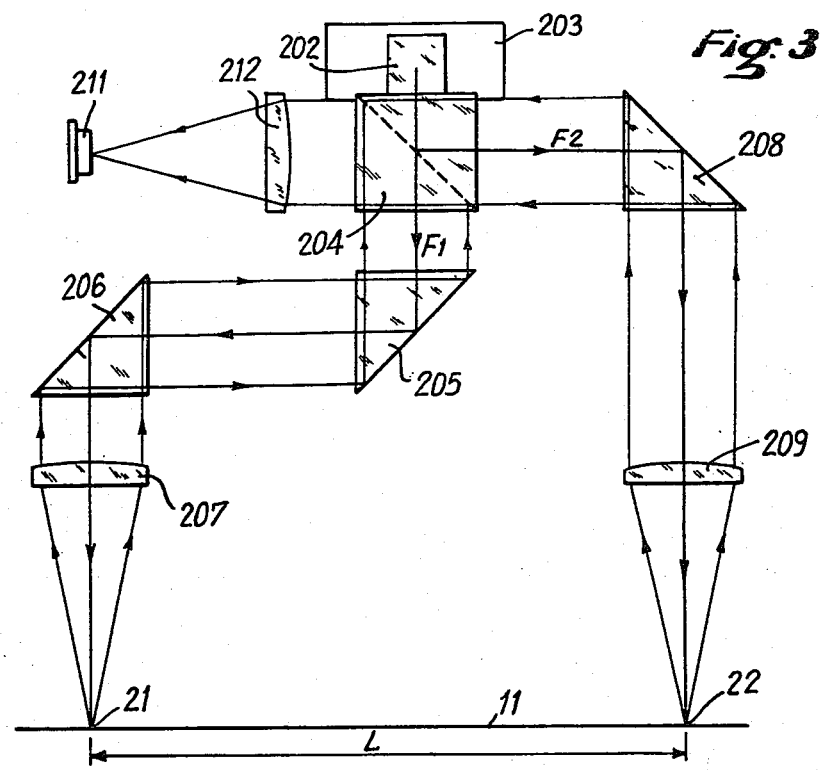
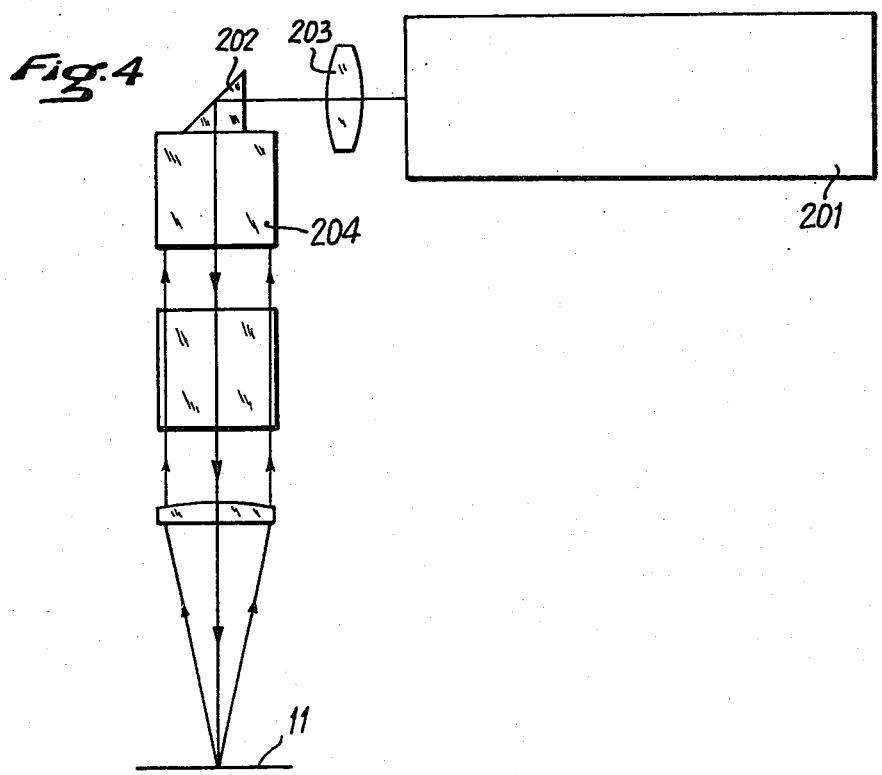

METHOD AND DEVICE FOR THE MEASUREMENT OF LINEAR SPEEDS WITHOUT CONTACT AND WITHOUT MARKING

The present invention which has been produced during the course of research carried out at the Centre Technique du Papier (CTP) with the collaboration of the Institut d'Optique Théorique et Appliqués (IOTA) and of the Centre d'Etudes des Phénomènes Aléatoires et de Géophysique (CEPHAG) deals with the direct measurement of linear speeds without any contact between the parts in relative motion and without any marking upon these parts.

The problem of direct industrial measurement of quantities connected with the movement of solids and fluids (speeds, lengths, flows) has for a long time lacked solutions, especially because of the necessity of placing the instrument in contact with the material in order to carry out the measurement of these quantities.

On the other hand within the last 10 years new technologies have given birth to a new family of industrial solutions for direct measurement of linear speeds or by integration of this speed, of length (integration with time) and flows (integration with distance).

All of these solutions have in common the putting into effect of a fairly simple detection which does not disturb the physical process, followed by a generally complicated processing to work out the measurement from the uncorrected signal proceeding from the detector or detectors.

The invention deals more particularly with the case where the direction of the movement is known and where only the amplitude is to be determined.

Hence one has pick-ups which do not disturb the physical process. When it is a question of movements of solid materials that means measurement without contact. When it is a question of fluid streams that means at least that the pick-ups are arranged in a wall without any portion immersed in the flow. Optical pick-ups are found in particular to satisfy these requirements.

Optical detection is one of those which seems to offer the greatest interest. Whether they have one or more beams, optical detectors comprise all of them one or more light sources, an optical system which guides the paths of the light energy and one or more detectors.

As far as the light source is concerned two choices are encountered, which are rather fundamentally different, depending upon whether it is a question of lamps (of quartz-iodine type, for example) or of low-power lasers (usually helium-neon). But it may also happen that the ambient light is sufficient for certain applications. The optical path is in general specific to the application. The detectors are usually photosensitive semi-conductors.

Behind the pick-ups are found components for processing the signals, which make wide use of modern electronic technology on the basis of integrated circuits in order to produce specialized analogue or numerical computer modules (counting, correlation, etc.) specific to the application envisaged.

The aim of the invention is to enable accurate measurement of linear speeds, either of a component while travelling past in front of a fixed station, for example, the travel of the sheet in a paper machine, or the speed of a moving part in front of a fixed base, for example, the speed of a vehicle on a railway, measured with respect to a rail. The invention may be applied equally well to the measurement of a fluid like the jet at the lips of a paper machine.

The invention employs the fact that the surface of the object travelling past is irregular and that if a point fixed in space through which the moving object passes as it travels is illuminated, it is possible to pick up a return transmission which is characteristic of the zone of the object in travel, being swept by the illumination. If under the same conditions two fixed points in space are illuminated, through which the object passes as it travels and if under the same conditions the two return transmissions are picked up, it is found that these irregular transmissions are as may be expected, identical except for a time lag, this lag depending upon the linear speed of travel past of the object. Measurement of this lag enables the linear speed to be calculated. This measurement may be effected by employing intercorrelation techniques. It is a question of an indirect measurement of the time of travel between two detectors. This time is represented by the abscissa of the "peak" of the curve of intercorrelation between the signals from the two detectors (see later). But these techniques can only be applied if the signals supplied by the detectors satisfy certain conditions (random signals, frequency spectrum of sufficient width, etc.). Now a first approach has enabled it to be concluded that the frequency spectrum of a signal diffused back by a sheet of paper, a metal sheet, for example, of steel or of aluminium at the output from a rolling mill, the surface of a rail of a railway, or else a metal wire at the output from a die, the jet at the lips of a paper machine, is sufficiently rich for obtaining a sufficiently sharp correlation "peak".

A device has already been proposed which applies this fact. This device includes two identical light sources with suitable optical systems for illuminating two points on the object travelling past, separated by a constant displacement. Two identical pick-ups receive the return signals. The pick-ups transform the light signals into electronic signals which are transmitted to stores through different delay lines in order to form images in the stores, and one of the delay lines is adjusted so as to obtain the superimposition of the images in the stores.

Such a device has been unable to receive industrial application because it is too costly and too difficult to set to work. It is obvious that the accuracy of the measurement depends upon the displacement between the points illuminated and grows with this displacement, and likewise depends upon the width of the zone illuminated in the direction of travel, the accuracy decreasing when this width increases. With lamp pick-ups giving upon the travelling object a spot of 0.5 to 1 mm, the pick-ups must be displaced by 50 to 100 cm from one another in order to enable an accuracy of one in a thousand in the measurement of the speed to be reached.

Such a displacement between the light sources has as a first result that of imposing a large dimension upon the device which consequently is bulky. A second result is the difficulty of having sufficiently accurate parallelism of the light beams arranged at such a displacement, for the return signals to be sufficiently similar. For these reasons and also because of the price of the apparatus, application has been unable to go beyond the stage of laboratory experiment.

The inventors considered that the employment of the laser or of the semi-conductor laser (diode laser) would because of the narrowness of the beam enable the distance between the points illuminated to be reached. As indicated above, one can in fact as a first approximation consider the ratio between the width of the slit observed and the distance between pick-ups as an image of the accuracy of the instrument; under these conditions, with the laser the two pick-ups may be placed at a gap of a few centimeters. It was then possible for the inventors to conceive of a compact device.

In addition, the power of the laser beam enables the device to be located without disadvantage at several centimeters from the object to be illuminated, which very much facilitates the putting of the device into place and multiplies its applications whereas with lamps it is necessary in default of complicated and costly optical systems to place the device at only a few millimeters from the surface to be illuminated, which in practice often renders application impossible.

The geometrical quality of the laser beam with its low divergence in addition enables a depth of field to be obtained, that is to say, a fairly large tolerance in adjustment, for example, of a few centimeters in the applications mentioned above. This allows in practice of applications which could not be realised with too small a depth of field. Beams of the same properties may be obtained with semi-conductor lasers (diode lasers) associated with an optical system of suitable collimation.

For these various reasons as well as for other reasons indicated below, the application of the laser in such a method confers important advantages.

The object of the invention is a method of continuous or practically continuous measurement of the linear speed of relative travel with respect to a measuring device, of an object of generally plane form and of great length, in which two fixed zones are illuminated in the path of the object (hence separated by a fixed distance), images of the two illuminated zones are formed on transducer means, then the signals emitted by the transducer means are processed in order to obtain the time of travel of a point on the travelling object in passing from one illuminated zone to the other.

In accordance with the invention the zones are illuminated by laser beams proceeding from one and the same source by division of the laser beam into two beams. In accordance with another advantageous characteristic of the invention the images of the illuminated zones are formed upon a one and only transducer, the output signal from which is processed by autocorrelation.

In accordance with the present invention a device for the continuous or practically continuous measurement of the linear speed of relative travel in front of the said measuring device, of an object of generally plane form and of great length at least over a zone of travel in front of the device, is characterized in that it includes a source of laser radiation, a separator system for forming two distinct beams, optical means for each beam for focussing the two beams upon two points across the gap between which the said object is made to pass and for returning a portion of the radiation retransmitted by the said points onto a single pick-up, means of processing the signals received at the pick-up by application of an autocorrelation function to the sum of the signals proceeding from the two zones illuminated and means of display or of recording of speed.

The separator system which effects the fractionation of the laser beam advantageously consists of a semi-transparent face. The transducer may be a single pick-up which receives simultaneously the diffusions back from the two emergent laser beams, and the signals from the pick-up are processed by the autocorrelation technique. It is essential that the optical assembly be rigid and in certain applications it may consist of a single block.

The description which follows, with respect to the attached drawings, given by way of non-restrictive example, will let it be well understood how the invention may be realised, the special features which appear both from the drawing and from the text of course forming part of the said invention.

FIG. 3 is a diagrammatic elevation of another embodiment of the invention.

FIG. 4 is a profile of the device as FIG. 3.

Figure 1:
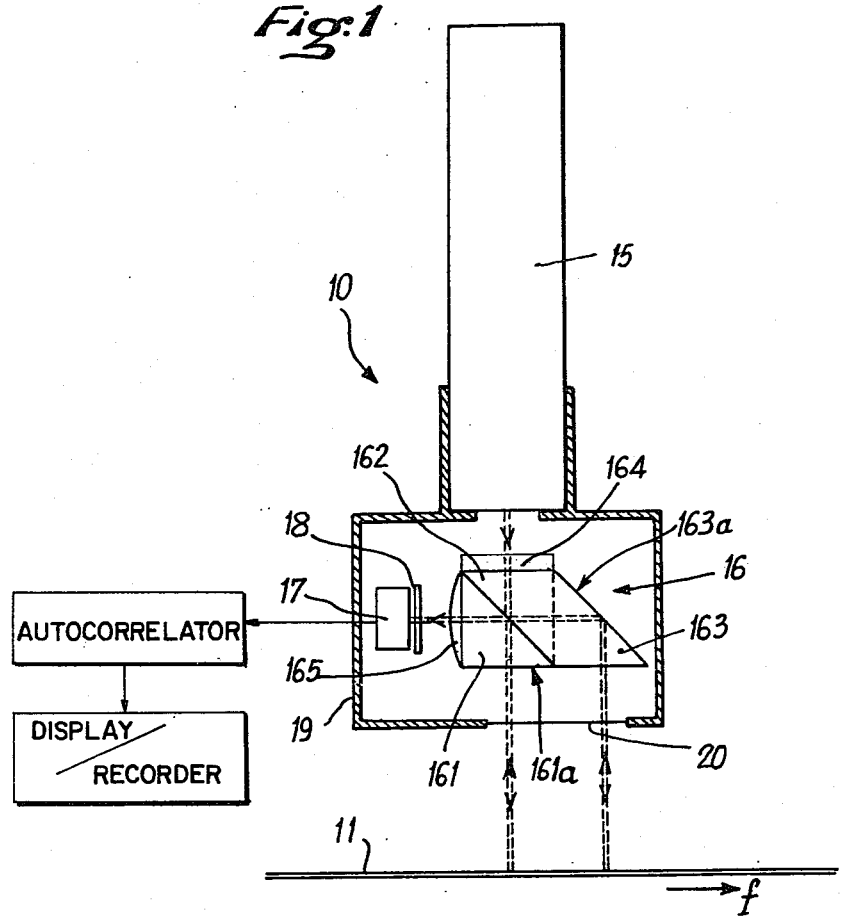
FIG. 1 is a diagrammatic elevation with partial sectioning of a device in accordance with the invention.

The device in accordance with the invention includes an apparatus 10 connected by a cable to a processing unit (not shown) which may be installed at any suitable place. The apparatus 10 when it is in service is placed at a few centimeters from an object 11 travelling, for example, in the direction of the arrow f, which may be a sheet of paper in a paper machine, a metal sheet leaving a rolling mill, a railway rail, etc. The apparatus includes a laser 15, an optical unit 16, a cell 17 with if necessary a filter 18 selective of the laser radiation, these parts being housed in a casing 19 in which is provided a window 20. The optical unit consists of prisms and lenses assembled by gluing. A pair of the two prisms 161 and 162 form a separator cube of a type available in the trade. The unit is obtained, starting from this cube, by addition of a prism 163 and two lenses, one cylindrical or toroidal lens 164 and a simple lens 165. This realization is advantageous but an equivalent might be employed, such as a semi-reflecting foil associated with a prism or a mirror. One output face 161a of the prism 161 is parallel with the surface of the object to be observed and the axis of emission from the laser is perpendicular to this surface. This preferential arrangement enables one to have in a simple way beams of incidence normal to the surface of the object 11, but this incidence is not indispensable, nor is it necessary that the axis of the laser be normal to the surface of the object 11. It might occupy any position provided that a suitable optical system gives at the outlet two parallel beams.

The laser is, for example, a helium-neon of two mW, with its supply unit. A semi-conductor laser may also be employed, which is smaller, less fragile and requires a much lower supply voltage.

The transducer 17 is advantageously a semi-conductor cell with a sensitive surface of 4×4 mm, advantageously preceded by an interference filter centered upon a frequency close to that of the laser which is 632.8 nm. A bundle of optical fibres may also be employed, which enables the receiver itself to be located at a more favourable place (less exposed, more convenient of access, etc.).

The device operates in the following fashion. The laser 15 emits a source beam which penetrates the optical unit by passing first of all through the lens 164, then the prism 162. The beam then meets the semi-reflecting surface and is divided in two, a first beam in prolongation of the source passes through the prism and is focussed at 21 upon the object 11, and a second beam focussed at 22 upon the object 11 after total reflection at the face 163a of the prism 163.

The axes of the beams diffused back coincide with those of the incident beams, between the separator system and the illuminated spots. After reflection respectively at the face 163a and at the semi-reflecting surface, the diffused-back beams are superimposed in order to coincide at the cell 17 after passing through the lens 165 and the filter 18. The two diffused beams are added optically and are thus returned on to one and the same cell. It is arranged in order to concentrate upon the cell a maximum amount of light preceeding from the points illuminated on the object 11. The optical unit also enables a concentration of the source beam which gives in the zone of travel of the object 11 a beam width of the order of 100μ for a length "crosswise" of a few millimeters (FIG. 2) and for a "depth of field" of several centimeters, which solves the problems of flapping of the object in travel.

The device thus constituted displays important advantages. There is only one source of coherent light, only one detector and a simple optical system which serves both for the illumination and for the collection of the beams diffused back. The cost price will consequently be relatively very favourable.

The volume of the apparatus is reduced, it may easily be put at the location which will be the most convenient. It is ensured that the emergent beams are always parallel, even if the levelling of the device is imperfect, the optical paths of the image beams are also parallel, that is to say, the two images observed by the cell through the optical system are presented at the same angle. The fact of having images elongated in the direction perpendicular to the travel, which is obtained by the cylindrical or toroidal lens (astigmatism of the beams) allows greater tolerance in the positioning of the apparatus. One is thus certain that a large portion of the area which is illuminated by the first beam will be represented in the spot illuminated by the second beam.

FIGS. 3 and 4 represent another embodiment of the invention. This device includes a laser 201 of which the axis is horizontal, that is to say, parallel with the plane of travel of the object 11. The incident beam is turned downwards by a prism 202 after having passed through a cylindrical lens 203. The beam next passes through a separator cube 204 in which it is separated into a first beam $F_1$ and a second beam $F_2$. The beam $F_1$ is focussed onto the point 21 by passing through two prisms 205 and 206, and then a lens 207. The beam $F_2$ is focussed at 22 by passing through the prism 208 and the lens 209. The axis of return of the beams diffused back is the same as the axis of the incident beam as far as the separator cube, then the beams are focussed towards a cell 211 by passing through a normal lens 212. The various parts are assembled rigidly in a suitable support. They are, for example, glued by one side face onto a rigid plate of, for example, aluminium or invar. Operation is the same as for the preceding apparatus. The dimensions of the apparatus are of the order of some fifteen centimeters, apart from the laser which is arranged perpendicularly.

The information collected in the transducer, by suitable processing enables the time of travel to be known, of a point on the object from the spot 21 to the spot 22. Although the devices described above may be employed with any means of processing of the information which enables this time of travel to be known, that is to say, the linear speed of the object 11, in accordance with an important characteristic of the present invention processing by correlation is employed because of the possibilities of numerical calculation, but also for other reasons. One is trying above all to produce a method of industrial measurement and hence of modest cost. One is aiming at applications, whether it be in measurement or in process control (automation), for which it would be sufficient in the great majority of cases to have available a pass band of 10 hertz, but for which an accuracy of 1 per 1000 would sometimes be scarcely sufficient: measurement of draw or slip. Finally it may be tolerated that the instrument carries out an average with distance.

The method of intercorrelation may lead to a very simple instrumental set-up; the accuracy of the measurement is sufficient; the pass band of the instrument is in practice limited by the necessity of carrying out an average over the curve of correlation before detecting the "peak".

The components and circuits corresponding with the correlation function are well known and exist on the market. They may be procured without difficulty and one skilled in the art can carry out a set-up suitable for the application envisaged.

If the autocorrelation or intercorrelation relations are conventional functions it does not seem that there is at present any industrial realization which enables accurate direct measurement of linear speeds (strip or jet) which employs the correlation of optical signals produced by a laser.

That is why it appears useful to recall briefly the principle in its application to the device of the present invention.

Figure 5:
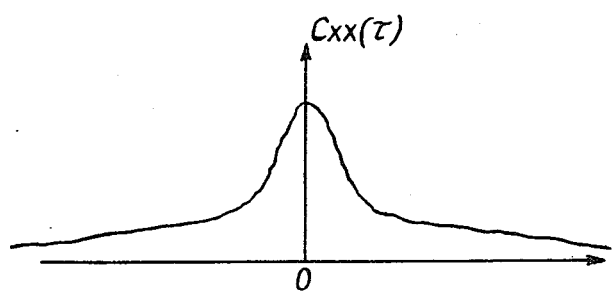
FIG. 5 is a graph representing an autocorrelation function of a random function.

Let us consider an experimental set-up in which point illumination is applied to a point, for example, on a sheet of paper in continuous travel, and in which the image of the illuminated spot is formed on a photosensitive cell. The paper being a heterogeneous material, the signal x(t) received by the cell as a function of time exhibits a random character and an estimate may be calculated of the autocorrelation function of this signal:

$$Cxx(\tau) = \frac{1}{T} \int_o^T x(t) \cdot x(t - \tau) \, dt \quad (1)$$

which will have the general shape represented in FIG. 5: a peak at the origin, more or less sharp depending upon the richness in frequencies of the spectrum of the light signal diffused back by the paper, the dimensions of the luminous spot, the integration period T chosen, etc.

Figure 2:
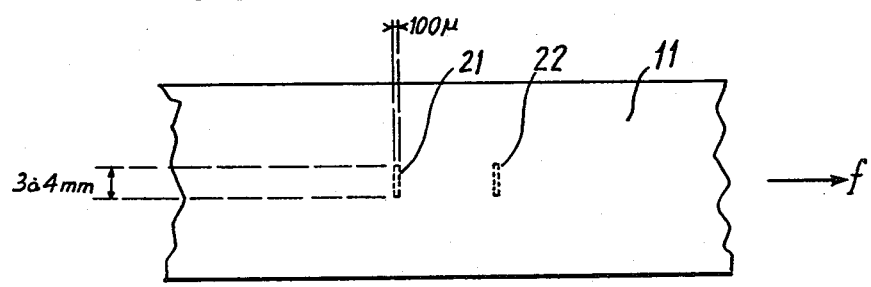
FIG. 2 is a diagrammatic representation in plan of the object of which the linear speed is to be measured.

Let us assume now the set-up as FIGS. 1 and 2 such that the spots 21 and 22 are aligned in the direction of motion of the sheet. The signal x(t) emitted at 22 will be the same as that y(t) emitted at 21, but delayed by a time $\tau_o = L/V$, L being the distance 21-22 and V the speed of continuous travel of the sheet. In other words:

$$x(t) = y\left(t - \frac{L}{V}\right). \quad (2)$$

Hence if the estimate of the function of intercorrelation between the two signals is calculated:

$$C_{xy}(\tau) = \frac{1}{T} \int_0^T x(t) \cdot y(t - \tau) \, dt \quad (3)$$

it may be seen from (2) that the curve obtained will be the same as the autocorrelation $C_{xx}(\tau)$ with a displacement of the origin of $\tau_0 = L/V$. Hence it will exhibit a peak centered upon the abscissa $\tau_0 = L/V$. Hence the detection of this peak and the measurement of its abscissa constitutes a technique enabling V to be measured.

In the device of the present invention the two signals are directed on to one and the same cell, the output signal from which is processed by autocorrelation. The autocorrelation function is the integral of a product of two factors which in the case of the sum of two signals become each the sum of two terms. The autocorrelation function becomes in this case the sum of four functions:

$$C_{zz}(\tau) = \frac{1}{T} \int_0^T z(t) \cdot z(t - \tau) \, dt \text{ with } z(t) =$$
$$x(t) + y(t) \text{ and } z(t - \tau) = x(t - \tau) + y(t - \tau)$$

the autocorrelation function of the composite signal may then be written:

$$C_{zz}(\tau) = \frac{1}{T} \int_0^T \{x(t) \cdot x(t - \tau) + y(t) \cdot y(t - \tau) + x(t) \cdot y(t - \tau) + y(t) \cdot x(t - \tau)\} dt$$

Figure 6:
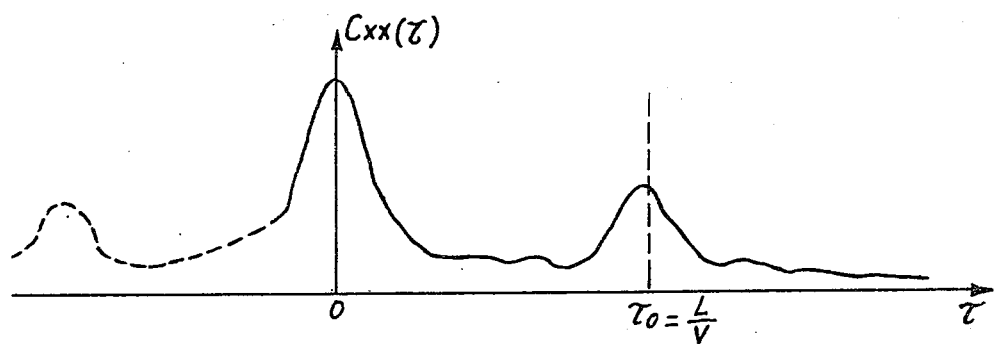
FIG. 6 is a graph representing an autocorrelation function of the sum of two random functions, the one having a time lag from the other.

It may be seen that each of the four functions exhibits a peak, the first two at the origin, the third a peak displaced onto the abscissa $\tau_0$ and the fourth a peak displaced onto the abscissa $-\tau_0$ (FIG. 6).

Hence by preserving only the positive portion, the overall autocorrelation function will exhibit one peak at the origin and one peak called the intercorrelation peak at the abscissa $L/V$. However, the amplitude of the peak at the origin will theoretically be double that of the intercorrelation peak.

The technique of detection of the second peak is applied exactly in the same way as if there were no peak at the origin, on the condition only that the width of the peak is small before T.

The signal from the photoelectric detector, suitably amplified and shaped is introduced into an electronic correlator module. The output from this module is a correlation curve given in the discrete form of n numerical values: $C_{xx}(m.\Delta t)$, $1 \leq m \leq n$.

In practice the calculations are carried out in numerical form, that is to say, that instead of the integral (1) one calculates the sum:

$$C_{xx}(m \cdot \Delta t) = \frac{1}{N + 1} \sum_{k=0}^{N} \{x(k\Delta t) \cdot y(k - m)\Delta t)\}$$

in which $\Delta t$ is the discretization step in the correlation curve obtained, and may equally well be at the same time the sampling period of the signal at the input to the correlator module; N is the number of elementary products produced by the correlator during the measurement time T; m is the row of the point calculated.

Figure 7:
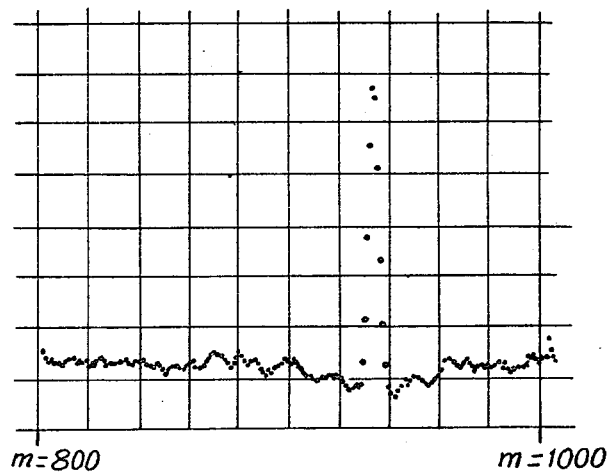
FIG. 7 represents a graph obtained in practice corresponding with the function from FIG. 5.

One might calculate 1000 points (at least) from the correlation curve. In FIG. 7 is seen an example of calculation with 200 points; it may be seen that one might be contented with calculating only, for example, 100 points, provided that one periodically "reframes" these 100 points, so as to avoid "losing" the peak in the event of a change of speed.

The sequel to the processing, carried out numerically, comprises a smoothing of the curve (average according to time); a detection of the intercorrelation peak; a calculation of the delay $\tau = p.\Delta t$; a division gives the speed $V = L/\tau$, L being the known interval between the two beams. The measurement of speed is next converted into an analogue signal (0–10 volts, for example) which will be brought up to date at each new calculation. The frequency of this bringing up to date is limited by the characteristics of the signals and by the performance of the processing module but it is as well that it should be as high as possible; by way of indication, 10 values per second would be considered as a very satisfactory frequency, 2 values per second as acceptable, one value every 5 seconds as unacceptable for the majority of applications.

Assuming L to be known exactly, the accuracy of the measurement of speed is the accuracy with which $\tau_0$ is calculated; hence it is a function;

of the sharpness of the peak;

of the discretization step in the correlation curve (resolution).

It is known that the sharper the peak is, the wider the frequency spectrum of the time signal. This spectrum is a function in particular of the pick-up and of the speed of travel of the strip. With a pick-up with a laser and for a speed of 10 m/s it has been possible to estimate that the highest frequencies of this spectrum were of the order of 100 KHertz. Hence the sampling frequency will have to be substantially higher, say, of the order of 500 KHertz, if one wants not to lose information and hence to ensure from this point of view an optimum sharpness of the peak.

Mr. Joël Liénard of CEPHAG has produced a correlator which is particularly well adapted to the processing of such signals; the embodiment of this correlator does not form any portion of the object of the invention.

We claim:

1. An optical apparatus for continuously measuring the linear speed of relative travel between said measuring apparatus and a generally planar, elongated object of great length over a zone of travel in front of said apparatus, characterized by: a single source of laser radiation, an optical separator system for dividing a laser beam from said source to form two distinct beams, optical means for each beam for focussing the two beams at two zones (21,22) on said object (11) spaced in the direction of relative travel across a gap between the apparatus and the passing object and for returning a portion of radiation reflected from said zones onto a single optical detector, means for processing signals reflected from the two zones illuminated and received at the detector by the application of an autocorrelation function to the sum of the signals to determine the relative linear speed of the object, and means for displaying or recording the measured speed, wherein the axes of the focussed and reflected beams of the optical means are coincident.

2. An apparatus as defined in claim 1, including means for rendering the beams astigmatic to provide elongated zones of illumination.

3. An apparatus as defined in claim 2, wherein said rendering means include a cylindrical or toroidal lens located between the laser source and the separator system.

4. An apparatus as defined in one of claims 1, 2 or 3, wherein the optical means includes a pair of prisms for elongating the path of an emergent beam in order to equalize the paths of two emergent beams.

* * * * *